United States Patent [19]
Kurimoto

[11] Patent Number: 4,918,297
[45] Date of Patent: Apr. 17, 1990

[54] OPTICAL IMAGE READING DEVICE
[75] Inventor: Yukuo Kurimoto, Shizuoka, Japan
[73] Assignee: Tokyo Electric Co., Ltd., Tokyo, Japan
[21] Appl. No.: 291,740
[22] Filed: Dec. 29, 1988
[30] Foreign Application Priority Data Jan. 8, 1988 [JP] Japan .................................. 63-2067
Jan. 8, 1988 [JP] Japan .................................. 63-2068

[51] Int. Cl.⁴ .......................................... G06K 15/00
[52] U.S. Cl. ................................... 235/383; 235/385
[58] Field of Search ............................... 235/383, 385

[56] References Cited
U.S. PATENT DOCUMENTS 4,838,383 6/1989 Saito ................................. 235/383

Primary Examiner—Harold I. Pitts
Attorney, Agent, or Firm—Frishauf, Holtz, Goodman & Woodward

[57] ABSTRACT

An image reading device includes a reading window which an article is set to face, a main light source for emitting first light beam which is emitted via the reading window to a limited external space to scan the article, and an image detection circuit for reading a bar code formed on an article from the first light beam reflected on the article placed within the limited external space and has traveled via the reading window. The image reading device further includes a light source control circuit for detecting that no article is set within the limited external space, to thereby inhibit the activation of the main light source.

8 Claims, 5 Drawing Sheets

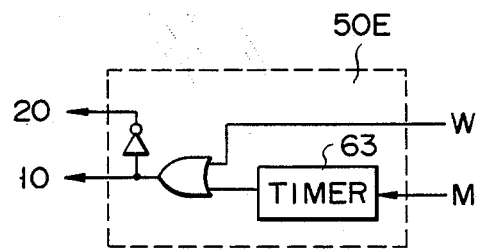
F I G. 8

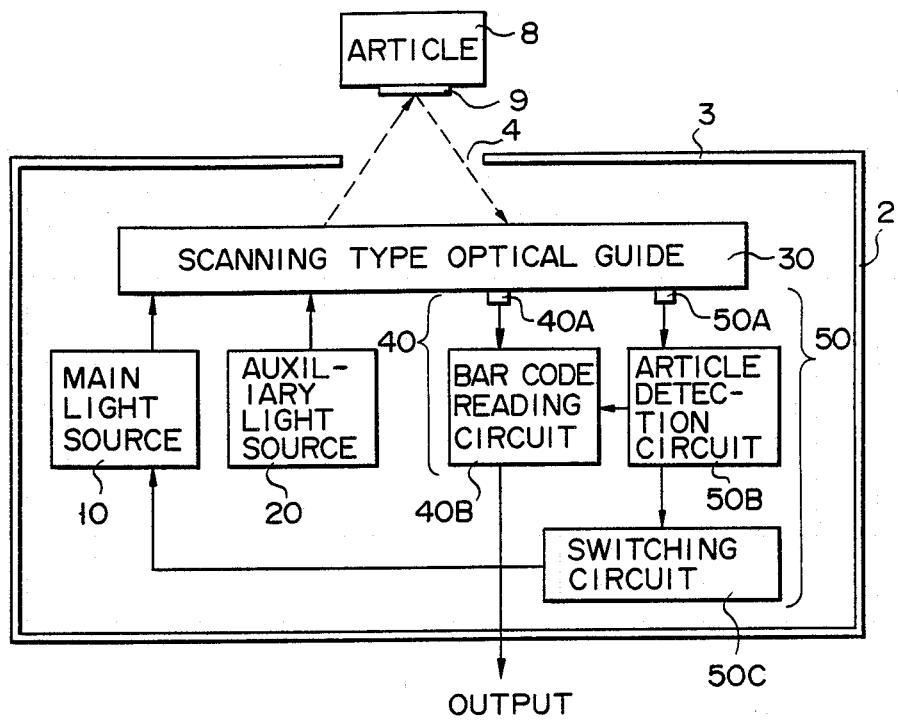
F I G. 3

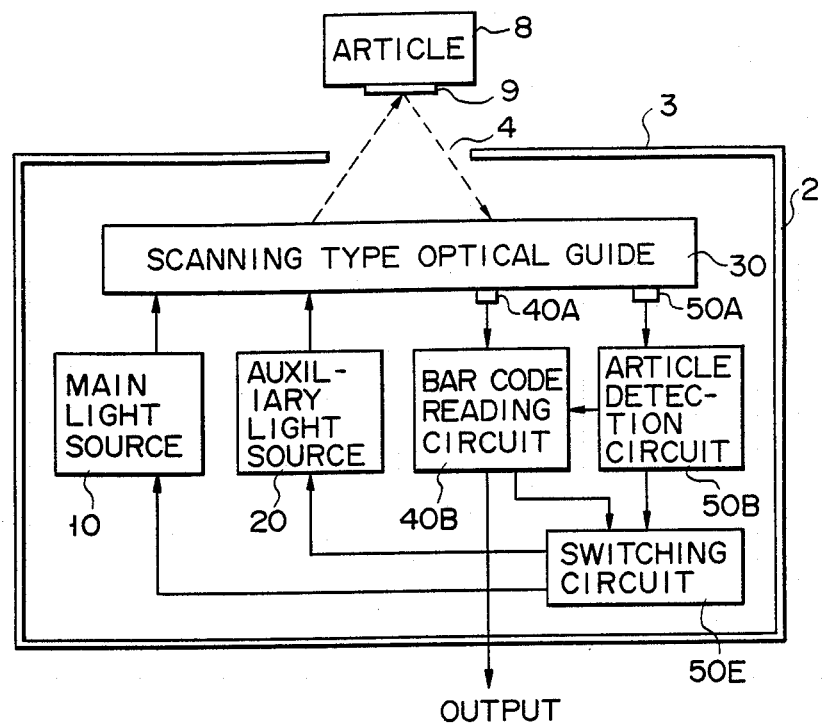
F I G. 6
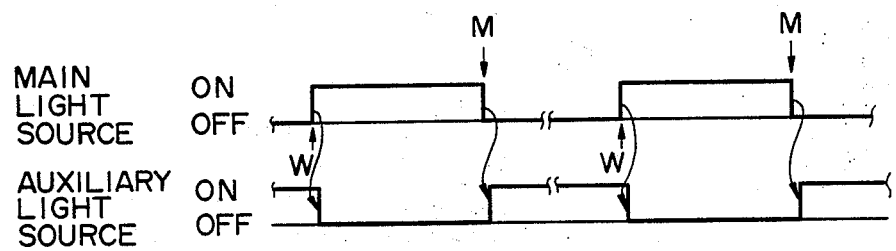
F I G. 7

OPTICAL IMAGE READING DEVICE

BACKGROUND OF THE INVENTION

1. Field of the Invention

This invention relates to an optical image reading device, and more particularly to an optical image reading device for optically reading a symbol formed on an article.

2. Description of the Related Art

In supermarkets, article information such as article name and price is printed on labels and the labels are attached to respective articles. Recently, the article information has been represented not only by characters and numerals but also by bar code formats for simplification of the settlement service. In this case, when the customer comes to the counter with articles put in a basket, the cashier or operator takes out the articles one by one from the basket, placing each article so that the image reader can read the bar code thereof, and then puts the articles into another basket or a paper bag, for example. The image reader acts in place of the cashier to input or register article information derived from the readout bar code into the cash register. After the registration for all the articles is completed, the cash register issues a receipt based on the registered article information.

FIG. 1 schematically shows the construction of the conventional optical image reader for reading the bar code from the label of the article. In the image reader, light generated from light source 1 is guided to reading window 4 by means of optical guide 6 in cabinet 2 and is emitted via reading window 4 to a limited external space. When label 9 attached to article 8 is set to face reading window 4 and the light is reflected to window 4 by label 9, the reflected light is directed to detection circuit ID by means of optical guide 6. Detection circuit ID reads the bar code of label 9 from the incident light to detect article information represented by the readout bar code. Light source 1 is generally constituted by use of a helium-neon (He-Ne) gas laser tube in order to reliably detect the tone of the light corresponding to the bar code.

In general, it is known that the service life of the gas laser tube is about 10,000 hours. Therefore, if the image reader is used in a shop which is open for 24 hours a day, it becomes necessary to replace the gas laser tube once each year.

In order to lengthen the serviceable period of the gas laser tube, that is, the period from the beginning of the use of the tube until the replacement thereof, it is considered viable to turn off the gas laser tube based on the judgment of the operator in, for example, the late evening, during which time the number of customers is minimal, and turn it on when necessary. However, in this case, the job of the operator is added to the normal job to increase the load on the operator.

It is further considered viable to set, on cabinet 2, a photo switch which energizes the gas laser tube when detecting the article. However, this method limits the transfer passage of the article. That is, when the article is taken out from the basket and is set to face reading window 4 without passing the photo switch, the gas laser tube is not energized. In this case, it is necessary to move the article to a position near the photo switch and set it again to face reading window 4, thus delaying the service.

SUMMARY OF THE INVENTION

An object of this invention is to provide an optical image reading device in which the serviceable period of the light source necessary for reading the symbol can be lengthened.

The above object can be attained by an image reading device comprising a reading window which an article is set facing; a main light source for emitting a light beam which is emitted via the reading window to a limited external space to scan the article; a symbol reading section for reading a symbol formed on the article from light beam which has been reflected by the article placed within the limited external space, and has traveled via the reading window; a light source control circuit for detecting that no article has been set within the limited external space, to thereby inhibit the activation of the main light source.

In the image reading device, the activation of the main light source is inhibited when it is detected that no article has been set within the limited external space. In this case, the serviceable period of the main light source can be lengthened in comparison with a main light source which is continuously activated. Since the main light source is activated when the article is set in a position at which the symbol formed thereon can be read, the transfer passage of the article will not be limited.

Further, the main light source is not continuously activated for a long period of time. Therefore, it is possible to easily keep the human body safe if the light beam emitted from the main light source is harmful.

BRIEF DESCRIPTION OF THE DRAWINGS

FIG. 3 is a block diagram showing a circuit of the optical image reading device shown in FIG. 2;

FIG. 6 is a block diagram showing a circuit of an image reading device according to a third embodiment of this invention;

FIG. 7 is a timing chart illustrating the operation of the image reading device of FIG. 6; and FIG. 8 is a modification of the switching circuit shown in FIG. 6.

DETAILED DESCRIPTION OF THE PREFERRED EMBODIMENTS

Figure 1:
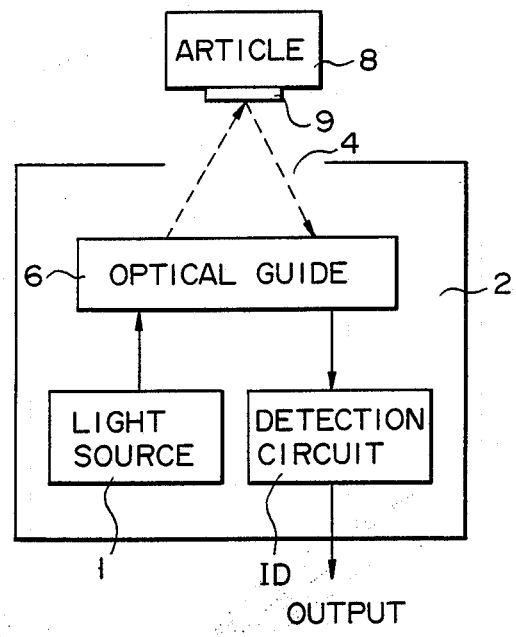
FIG. 1 is a diagram schematically showing the conventional optical image reader.
Figure 2:
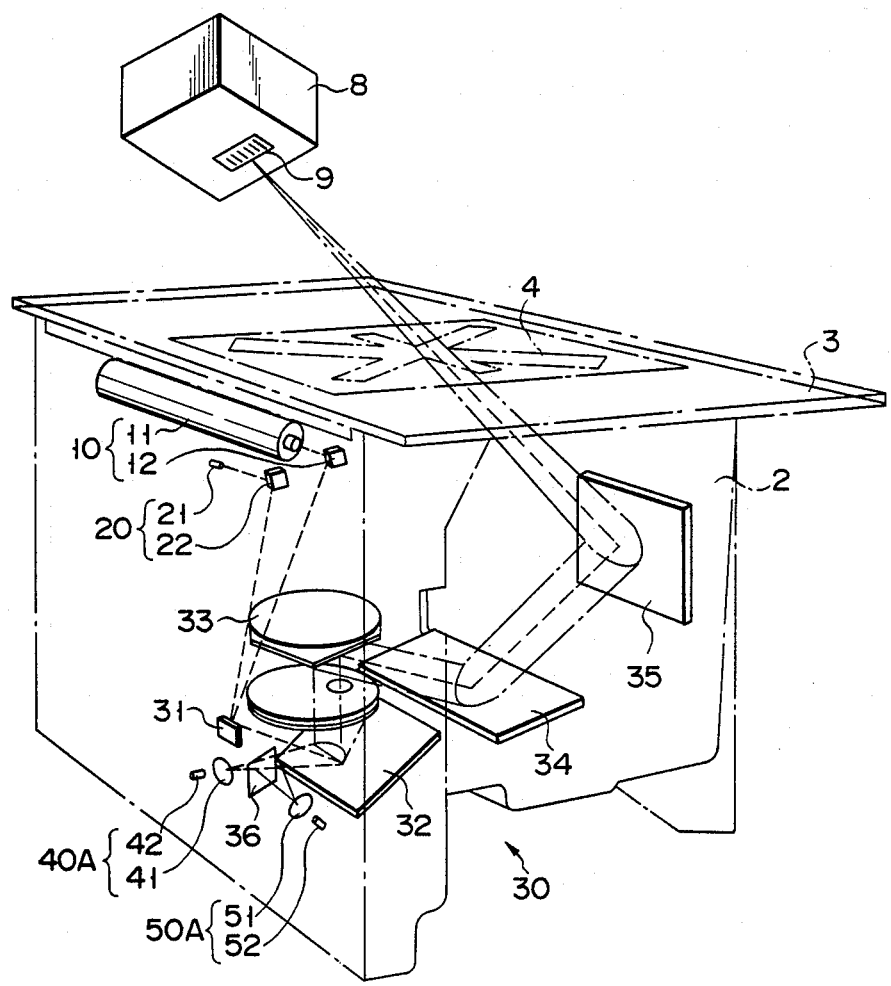
FIG. 2 is a perspective view showing the internal structure of an optical image reading device according to a first embodiment of this invention.

There will now be described an optical image reading device according to the first embodiment of this invention with reference to FIGS. 2 and 3. FIG. 2 shows the internal structure of the optical image reading device and FIG. 3 shows a circuit of the optical image reading device. The optical image reading device includes main body 2, reading window 4, main light source 10, auxiliary light source 20, scanning type optical guide 30, image detecting circuit 40, and light source control circuit 50. Reading window 4 is disposed on top surface 3 of main body 2. The optical image reading device is used to read bar code form label 9 attached to article 8.

Main light source 10 includes helium-neon (He-Ne) gas laser tube 11 and reflection mirror 12, and auxiliary light source 20 includes semiconductor laser 1 and reflection mirror 22. Semiconductor laser 21 has a print contrast signal (PCS) value of 13 when measured by using K liner paper and color guide TOYPAC36 ultramarine blue produced by TOYO INKI Manufacturing Inc. and a reflection factor of 70. In the case of the He-Ne laser, the PCS value is 78 and the reflection factor is 11. That is, semiconductor laser 21 is low in color identification ability in comparison with the He-Ne laser, but its service life may be longer because of its structure.

As shown in FIG. 2, scanning type optical guide 30 includes reflection mirrors 31 and 32, rotation mirror 33, reflection mirrors 34 and 35, and half mirror 36 which are cooperated with each other to emit laser beams emitted from light sources 10 and 20 via reading window 4 to a limited external space defined as a reading space. The emitting direction of each laser beam is changed by rotation mirror 33 so as to scan article 8 which is set facing reading window 4. When article 8 is placed within the reading space, each laser beam is reflected on article 8 and transmitted via reading window 4 and optical guide 30 to half mirror 36. Half mirror 36 is constituted to allow the gas laser beam to pass through, but reflects the semiconductor laser beam.

Image detection circuit 40 includes, light receiving section 40A and bar code reading circuit 40B. Light receiving section has condenser lens 41 and photo sensor 42. Photo sensor 42 receives the ga laser beam applied from half mirror 36 through condenser lens 41. When label 9 of article 8 is set facing reading window 4 in the reading space, the gas laser beam from light source 10 is reflected on label 9 and directed to light receiving section 40A. The received gas laser beam is converted, at light receiving section 40A, into an electrical signal, and is supplied to bar code reading circuit 40B. Bar code reading circuit 40B detects the width of each bar and the interval between bars based on the pulse width of the electrical signal, and detects numerals based on the detected widths and intervals. Further, bar code reading circuit 40b checks whether the check digit is correct or not. When it is detected that the check digit is correct, then an output signal corresponding to the detected bar code is supplied to the exterior.

Light source control circuit 50 is used to detect the presence of article 8 in cooperation with auxiliary light source 20 and optical guide 30 and control the operation of main light source 10. Light source control circuit 50 includes light receiving section 50A, article detection circuit 50B, and switching circuit 50C. Light receiving section 50A has condenser lens 51 and photo sensor 52. Photo sensor 52 receives the semiconductor laser beam applied from half mirror 36 through condenser lens 51. When article 8 is placed in the reading space, the semiconductor laser beam from auxiliary light source 20 is reflected on article 8 and directed to light receiving section 50A. The received semiconductor laser beam is converted, at light receiving section 50A, into an electrical signal.

Article detection circuit 50B amplifies, integrates and smoothes the output signal of light receiving section 50A in order to check whether or not article 8 is set within the reading space. When it is detected that article 8 is set within the reading space, an article detection signal is generated from article detection circuit 50B. The article detection signal is supplied to switching circuit 50C and bar code reading circuit 40B.

Switching circuit 50C activates main light source 10 when the article detection signal is supplied from article detection circuit 50B, and de-activates main light source 10 after the article detection signal has been interrupted. Further, bar code reading circuit 40B starts the operation in response to the article detection signal supplied form article detection circuit 50B.

Now the operation of the image reading device will be explained.

When the power source switch of the image reading device is turned on, auxiliary light source 20 is activated to emit semiconductor laser light beam. Th semiconductor laser light beam is directed to optical guide 30, and is guided by optical guide 30 so as to be emitted as scanning light beam via reading window 4 of main body 2. If article 8 is not present within the reading space, the semiconductor laser beam is scattered outwardly. As a result, no reflected laser beam is received by photo sensor 52 of light receiving section 50A via optical guide 30. When article 8 is placed in the reading space, the semiconductor laser beam is reflected on article 8, is then transmitted via reading window 4 and optical guide 30, reflected on half mirror 36, and applied to photo sensor 52. Article detection circuit 50B detects the presence of article 8 from the output signal of light receiving section 50A. Then, light source control circuit 50 activates gas laser tube 11 of main light source 10.

The gas laser beam from main light source 10 is emitted via scanning type optical guide 30 and reading window 4 in the same manner as described before. At this time, article 8 is already set in the reading space. When label 9 attached to article 8 is scanned by means of the gas laser beam, the gas laser beam is reflected on label 9 and then applied to photo sensor 42 of light receiving section 40A via optical guide 30 and half mirror 36. Bar code detection circuit 40B derives the bar code of label 9 from the output signal of light receiving section 40A and externally supplies a signal corresponding to the derived bar code. When article 8 is moved out from the reading space after the bar code has been read, light source control circuit 50 no longer receives the laser beam which is emitted from auxiliary light source 20, and the article detection signal is interrupted. At this time, switching circuit 50C deactivates main light source 10.

According to the above embodiment, the presence of article 8 is detected by article detection circuit 50 in cooperation with auxiliary light source 20 and optical guide 30, and gas laser tube 11 of main light source 10 is activated when article 8 is detected. In this case, gas laser tube 11 will not be activated if it is not necessary to read bar code 9. As a result, the serviceable period of gas laser tube 11 is longer than if the gas laser tube is continuously activated.

Further, optical guide 30 guides the light beams from main light source 10 and auxiliary light source 20 to the outside via reading window 4 and guides light beam reflected from the outside to image detection circuit 40 and light source control circuit 50. In this case, it is possible to activate main light source 10 by setting article 8 in a position at which the bar code formed thereon can be read. Therefore, the passage of article 8 is not limited.

Figure 4:
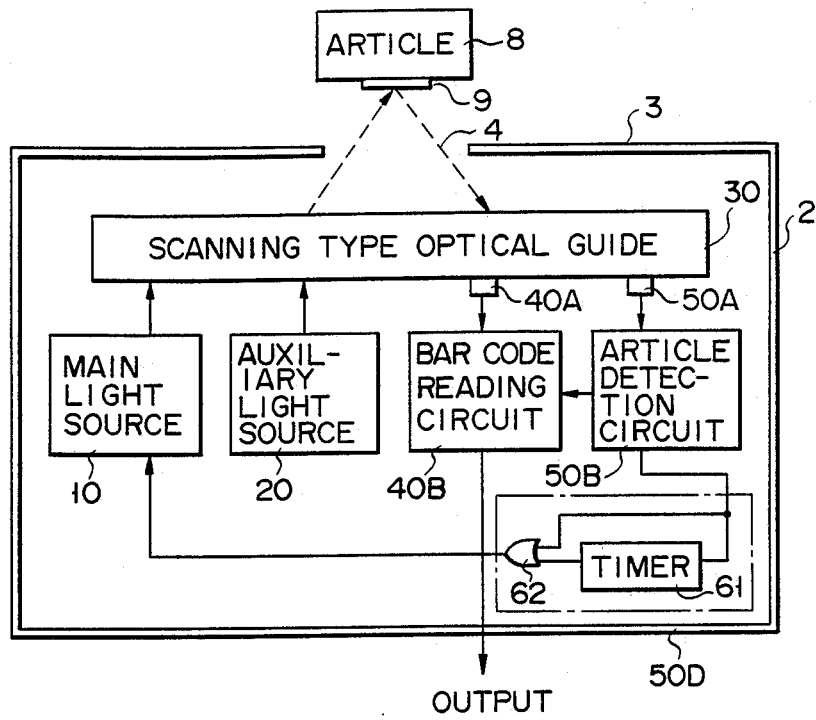
FIG. 4 is a block diagram showing a circuit of an optical image reading device according to a second embodiment of this invention.

FIG. 4 shows the construction of an optical image reading device according to a second embodiment of this invention. The optical image reading device is similar to that of the first embodiment except for switching circuit 50D.

Figure 5:
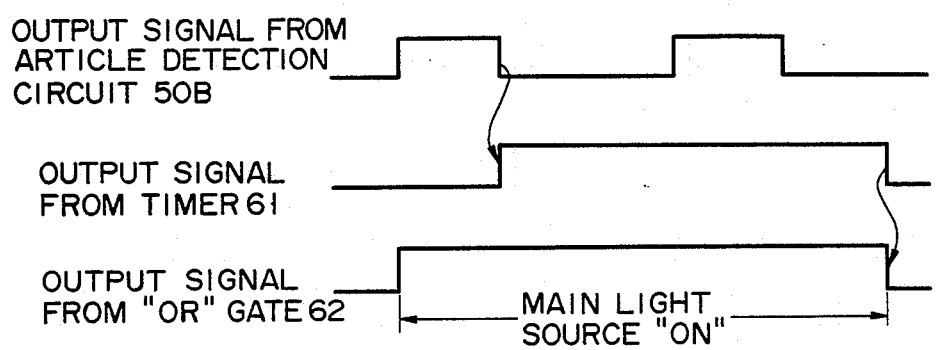
FIG. 5 is a timing chart illustrating the operation of the optical image reading device of FIG. 4.

For example, in a convenience store which is open for 24 hours a day, there are extremely busy time zones before and after the noon and in the evening. In such time zones, it is impossible to set a long de-activation time for main light source 10. Further, if main light source 10 is turned on and off each time article 8 is passed by reading window 4, the service life of gas laser tube 21 is shortened. Switching circuit 50D includes variable timer 61 and OR gate 52. Switching circuit 50D permits main light source 10 to be activated when light source control circuit 50 has detected article 8, and keeps main light source 10 in the activated condition for a preset period of time set by timer 61 even after article 8 has not been detected as shown in FIG. 5. The output signal of article detection circuit 50B falls when article 8 is moved out of the reading space. Timer 61 is triggered by the fall of the output signal to hold an output signal of OR gate 62 at "H" level so as to delay the de-activation of main light source 10. If, during this time period, article 8 is set with the reading space, the output signal of article detection circuit 50B is again set to be at "H" level. As a result, in the case where articles 8 are successively set in the reading space, main light source 10 can be kept activated. Thus, main light source 10 can be prevented from being unnecessarily turned on and off repeatedly, and the serviceable period of main light source 10 becomes longer than in the case of the former embodiment, without making work of the operator complex.

In the second embodiment, timer 61 is triggered when article 8 has not been detected, but it is possible to trigger timer 61 when article 8 has been detected. In this case, a preset timer period set in timer 61 is set to be sufficiently longer than the time required for bar code reading circuit 40B to read the bar code.

FIG. 6 shows a circuit of an optical image reading device according to a third embodiment of this invention. The image reading device of this embodiment is constructed in the same manner as that of the first embodiment except that main light source 10 and auxiliary light source 20 are alternately activated. In the image reading device of FIG. 6, article detection signal W is generated from article detection circuit 50B when an article is detected, and reading completion signal M is generated from bar code reading circuit 40B when reading of the bar code is completed. As shown in FIG. 7, switching circuit 50E permits main light source 10 and auxiliary light source 20 to be respectively activated an de-activated in response to article detection signal W, and causes main light source 10 and auxiliary light source 20 to be respectively deactivated and activated in response to reading completion signal M. In this case, either main light source 10 or auxiliary light source 20 is selectively connected to the power source by means of switching circuit 50E.

In the third embodiment, since auxiliary light source 20 is de-activated which main light source 10 is kept activated, it becomes possible to lengthen the serviceable period of auxiliary light source 20.

Further, in the third embodiment, main light source 10 is de-activated immediately after an article is detected in the same manner as in the case of the first embodiment. In this case, as has been explained in the second embodiment, main light source may be unnecessarily turned on and off repeatedly. However, if timer 61 for keeping main light source 10 in the active condition for a preset period of time in response to reading completion signal M is added to switching circuit 50E as shown in FIG. 8, or if bar code reading circuit 40B is constructed to delay the generation timing of reading completion signal W by a preset period of timer after the bar code reading is completed, the number of times main light source 10 is turned on and off can be reduced. In this case, the service life of main light source 10 can be prevented from being shortened.

This invention is not limited to the above embodiments in which the bar code on the label attached to an article is read, but can be applied to the case where the bar codes directly printed on articles, or symbols other than the bar codes, for example, characters and numerals are read.

In the above embodiments, gas laser tube 11 is used as main light source 10 and semiconductor laser element 21 is used as auxiliary light source 20. However, this combination is only an example. Main light source 10 is required to emit light which has sufficiently high energy to read symbols displayed on articles. For this reason, the types of light sources which can be used for this purposed are limited to those whose power consumption is large and service life is short. For example, the light source of this type is a He-Ne gas laser tube for emitting light with a wavelength of 630 nm and a semiconductor laser element (laser diode) for emitting light with a wavelength of 670 nm. Since auxiliary light source 20 is used only to detect and article, various types of light sources can be used as auxiliary light source 20. In this case, since auxiliary light source 20 is always activated while main light source 10 is de-activated, it is desirable to use a light source with long service life as auxiliary light source 20. If the light source is selected according to long service life, at least red, near infrared, or green type light emission diode may be satisfactory. Further, some of laser diodes have a long service life and can be used as auxiliary light source 20. Since auxiliary light source 20 is not required to have high output power energy, use of these light sources will not significantly increase the power consumption and will not lower the security for the human body.

It is necessary for light receiving sections 42 and 52 to correctly detect light beams emitted from main light source 10 and auxiliary light source 20. If there is a possibility that light beams emitted from main light source 10 and auxiliary light source 20 are erroneously detected by means of light receiving section 52 and 42, the light beams may be set to have different wavelengths.

What is claimed is:

1. An optical image reading device comprising:
   a reading window which an article is set facing;
   a main light source for emitting a first light beam which is emitted via said reading window to a limited external space to scan the article;
   symbol reading means for reading a symbol formed on the article from the first light beam which has been reflected by the article placed within the limited external space and has traveled via said reading window; and
   light source control means for detecting that no article has been set within the limited external space, to thereby inhibit the activation of said main light source.

2. An image reading device according to claim 1, wherein said light source control means includes an auxiliary light source for emitting a second light beam which is emitted via said reading window the limited external space and article detection means for detecting the article from the second light beam which has been reflected on the article and has traveled via said reading window.

3. An image reading device according to claim 2, wherein said light source control means includes switching means for keeping said main light source in the activated condition while an article is detected by said article detection means, and de-activating said main light source after the absence of article has been detected by said article detection means.

4. An image reading device according to claim 3, wherein said switching means includes a timer circuit for keeping said main light source in the activated condition for a preset period of time after the absence of article has been detected by said article detection means.

5. An image reading device according to claim 2, wherein said light source control means includes switching means for keeping said main light source and auxiliary light source respectively in the activated and de-activated conditions after an article has been detected by said article detection means and setting said main light source and auxiliary light source into the de-activated and activated conditions after the symbol reading by said symbol reading means has been completed.

6. An image reading device according to claim 5, wherein said switching means includes a timer circuit for keeping said main light source and auxiliary light source in the activated and de-activated conditions for a preset period of time after the symbol reading by said symbol reading means has been completed.

7. An image reading device according to claim 2, further comprising an optical guide section for guiding the first light beam from said main light source to the outside via said reading window, directing the first light beam reflected and received via said reading window towards said symbol reading means, guiding the second light beam from said auxiliary light source to the outside via said reading window, and directing the second light beam reflected and received via said reading window towards said article detection means.

8. An image reading device according to claim 2, wherein said main light source includes a gas laser tube or laser diode, and said auxiliary light source incudes a light emitting diode or laser diode.

* * * * *